(12) United States Patent
Wu et al.

(10) Patent No.: US 11,044,037 B2
(45) Date of Patent: Jun. 22, 2021

(54) INFORMATION TRANSMISSION METHOD AND DEVICE

(71) Applicant: Huawei Technologies Co., Ltd., Shenzhen (CN)

(72) Inventors: Yiqun Wu, Shanghai (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/272,952

(22) Filed: Feb. 11, 2019

(65) Prior Publication Data

US 2019/0173608 A1 Jun. 6, 2019

Related U.S. Application Data

(63) Continuation of application No. PCT/CN2017/097090, filed on Aug. 11, 2017.

(30) Foreign Application Priority Data

Aug. 11, 2016 (CN) .......................... 201610658101.7

(51) Int. Cl.
*H04W 4/00* (2018.01)
*H04L 1/00* (2006.01)
*H04L 5/00* (2006.01)

(52) U.S. Cl.
CPC .......... *H04L 1/0003* (2013.01); *H04L 1/0009* (2013.01); *H04L 1/0052* (2013.01); *H04L 1/0071* (2013.01); *H04L 5/0005* (2013.01); *H04L 5/0048* (2013.01); *H04L 5/0032* (2013.01); *H04L 5/0062* (2013.01)

(58) Field of Classification Search
None
See application file for complete search history.

(56) References Cited

U.S. PATENT DOCUMENTS

2010/0284377 A1* 11/2010 Wei ..................... H04L 27/2602
370/336
2011/0086663 A1* 4/2011 Gorokhov ........... H04W 52/244
455/522

(Continued)

FOREIGN PATENT DOCUMENTS

CN 101505293 A 8/2009
CN 101540751 A 9/2009

(Continued)

OTHER PUBLICATIONS

R1-164262 ZTE, "Remaining issue with link level simulation for multiple access", 3GPP TSG RAN WG1 Meeting #85, Nanjing, China, May 23-27, 2016,total 4 pages.

*Primary Examiner* — Phirin Sam
(74) *Attorney, Agent, or Firm* — Hauptman Ham, LLP

(57) ABSTRACT

Embodiments of this application provide an information transmission method and a device, so as to improve communication reliability and reduce complexity of processing by a receive end. The method includes: determining, by a terminal device, a data processing mode, where the data processing mode includes a modulation and coding mode; processing data based on the data processing mode; determining a pilot signal based on the data processing mode; and sending the pilot signal and processed data.

17 Claims, 4 Drawing Sheets

(56) References Cited

U.S. PATENT DOCUMENTS

| | | | |
|---|---|---|---|
| 2011/0090859 A1* | 4/2011 | Wakabayashi | H04W 72/08 |
| | | | 370/329 |
| 2014/0126551 A1* | 5/2014 | Nammi | H04L 1/0025 |
| | | | 370/336 |
| 2014/0226761 A1* | 8/2014 | Nory | H04L 5/0048 |
| | | | 375/340 |
| 2014/0254544 A1 | 9/2014 | Kar Kin Au et al. | |
| 2014/0362779 A1* | 12/2014 | Venkatachari | H04W 52/226 |
| | | | 370/329 |
| 2015/0326422 A1* | 11/2015 | Sagong | H04L 27/38 |
| | | | 375/298 |
| 2017/0290052 A1* | 10/2017 | Zhang | H04W 74/004 |
| 2018/0006794 A1* | 1/2018 | Lee | H04B 1/525 |
| 2018/0146474 A1 | 5/2018 | Luo et al. | |

FOREIGN PATENT DOCUMENTS

| | | |
|---|---|---|
| CN | 101557378 A | 10/2009 |
| CN | 102209061 A | 10/2011 |
| CN | 104159318 A | 11/2014 |
| CN | 105554901 A | 5/2016 |
| WO | 2008060203 A1 | 5/2008 |
| WO | 2013130460 A1 | 9/2013 |

\* cited by examiner

INFORMATION TRANSMISSION METHOD AND DEVICE

CROSS-REFERENCE TO RELATED APPLICATIONS

This application is a continuation of International Patent Application No. PCT/CN2017/097090 filed on Aug. 11, 2017, which claims priority to Chinese Patent Application No. 201610658101.7 filed on Aug. 11, 2016. The disclosures of the aforementioned applications are hereby incorporated by reference in their entireties.

TECHNICAL FIELD

This application relates to the communications field, and more specifically, to an information transmission method and a device.

BACKGROUND

In a typical wireless communications network (such as a Long Term Evolution (LTE)) network, selection of an uplink shared data channel is based on a scheduling/grant mechanism, and is completely controlled by a base station (BS). In this mechanism, user equipment (UE) first sends an uplink scheduling request to the BS. After receiving the request, the BS sends an uplink grant to the UE to notify the UE of an uplink transmission resource that is allocated to the UE. Accordingly, the UE transmits data on the granted uplink transmission resource.

Large-scale user access is one of typical application scenarios of a next-generation communications network. When a large quantity of users are accessed, if the foregoing scheduling/grant mechanism is used, on one hand, high signaling transmission overheads and a scheduling pressure of BS resource allocation will be caused; on the other hand, significant transmission latency will be caused. In view of this, the next-generation communications network uses a grant free (Grant Free) transmission mode to support the large quantity of access users.

Because the foregoing grant free transmission for the large quantity of access users allows a plurality of UEs to contend for transmission on a same time-frequency resource, a contention conflict is caused, and reliability of the grant free transmission of reduced. In addition, because a receive end needs to blindly detect data of a terminal device, processing by the receive end is complex.

SUMMARY

Embodiments of this application provide an information transmission method and a device, so as to improve communication reliability and reduce complexity of processing by a receive end.

According to a first aspect, an embodiment of this application provides an information transmission method, including:

determining, by a terminal device, a data processing mode;

processing data based on the data processing mode;

determining a pilot signal based on the data processing mode; and sending the pilot signal and processed data.

Therefore, in this embodiment of this application, the terminal device may determine the data processing mode; data is processed based on the data processing mode; the pilot signal is determined based on the data processing mode; and the pilot signal and the processed data are sent, so that a receive end may determine the data processing mode based on the pilot signal. This avoids complexity of blind detection performed by the receive end on the data processing mode; and further, the terminal device may select a required modulation and coding mode based on a requirement, so as to meet a transmission requirement and improve transmission reliability.

Optionally, in an implementation of the first aspect, the data processing mode includes at least one of the following processing modes: a modulation and coding mode, an interleaving mode, and a spreading mode.

Optionally, in an implementation of the first aspect, the determining a pilot signal based on the data processing mode is specifically:

determining the pilot signal based on a mapping relationship between the data processing mode and the pilot signal.

Optionally, in an implementation of the first aspect, the mapping relationship between the data processing mode and the pilot signal may be implemented by using a table.

Optionally, in an implementation of the first aspect, the mapping relationship between the data processing mode and the pilot signal may be implemented by using a formula.

Optionally, in an implementation of the first aspect, the determining a pilot signal based on the data processing mode is specifically:

determining an index of the pilot signal based on an index of the data processing mode; and determining the pilot signal based on the index of the pilot signal.

Optionally, in an implementation of the first aspect, the data processing mode includes a plurality of processing modes, and different processing modes in the plurality of processing modes are corresponding to one or more different bits of the index of the pilot signal; and the determining an index of the pilot signal based on an index of the data processing mode is specifically:

determining, based on an index of each of the plurality of processing modes, a value of a bit that is corresponding to each processing mode and that is in the index of the pilot signal, and determining the index of the pilot signal.

Optionally, in an implementation of the first aspect, the data processing mode includes first to $g^{th}$ processing modes, and g is an integer greater than or equal to 2; and the determining a pilot signal based on the data processing mode is specifically:

determining the index of the pilot signal based on a value y, where the value y is determined based on a condition that meets the following formula:

$$y = \sum_{i=1}^{i=g-1} x_i \prod_{j=i+1}^{j=g} N_j + x_g$$

where $x_g$ indicates an index of the $g^{th}$ processing mode, $x_i$ indicates an index of an $i^{th}$ processing mode, and $N_j$ indicates a quantity of $j^{th}$ processing modes that are selectable.

Optionally, in an implementation of the first aspect, when a quantity K of pilot signals that are selectable is equal to a product of the quantities of the first to the $g^{th}$ processing modes that are selectable, the determining the index of the pilot signal based on a value y is specifically:

determining an index f of the pilot signal based on a condition that meets the following formula:

$f=(y+S) \bmod K$ where S is a value corresponding to at least one of: a cell identifier of the terminal device, an identifier of the terminal device, time domain resource information, and frequency domain resource information, and mod indicates modulo processing.

Optionally, in an implementation of the first aspect, when a quantity K of pilot signals that are selectable is equal to a product of the quantities of the first to the $g^{th}$ processing modes that are selectable, the determining the index of the pilot signal based on a value y is specifically:

determining the index f of the pilot signal based on a condition that meets the following formula:

$$f=(q\cdot y+p+S)\bmod K$$

where S is the value corresponding to the at least one of: the cell identifier of the terminal device, the identifier of the terminal device, the time domain resource information, and the frequency domain resource information, q is a constant, p belongs to [0, q−1], and mod indicates the modulo processing.

Optionally, in an implementation of this embodiment of this application, the determining, by a terminal device, a data processing mode is specifically:

determining, by the terminal device, the data processing mode based on at least one of the following information:

state information of a channel between the terminal device and a receive end of the data;

a data processing mode corresponding to data that is previously sent to the receive end and information fed back by the receive end for the previously sent data; and a broadcast message or a unicast message of the receive end of the data.

Therefore, in this embodiment of this application, the terminal device determines at least one of the data processing modes, and determines a preferable modulation and coding mode based on the state information of the channel between the receive ends of the data, the data processing mode corresponding to the previously transmitted data, the NACK/ACK fed back by the receive end, and the broadcast message or the unicast message of the receive end of the data, so as to improve transmission efficiency.

According to a second aspect, an information transmission method is provided, including:

receiving a pilot signal and data that are sent by a terminal device;

determining a data processing mode based on the pilot signal; and processing data based on the data processing mode.

Optionally, in an implementation of the second aspect, the data processing mode further includes at least one of the following processing modes: an interleaving mode, a spreading mode, and a modulation and coding mode.

Optionally, in an implementation of the second aspect, the determining a data processing mode based on the pilot signal is specifically:

determining the data processing mode based on a mapping relationship between the pilot signal and the data processing mode.

Optionally, in an implementation of the second aspect, the determining a pilot signal based on the data processing mode is specifically:

determining the data processing mode based on the pilot signal and at least one of: a cell identifier of the terminal device, an identifier of the terminal device, time domain resource information, and frequency domain resource information.

Optionally, in an implementation of the second aspect, the determining a data processing mode based on the pilot signal is specifically:

determining an index of the data processing mode based on an index of the pilot signal; and determining the data processing mode based on the index of the data processing mode.

Optionally, in an implementation of the second aspect, the data processing mode includes a plurality of processing modes, and different processing modes in the plurality of processing modes are corresponding to one or more different bits of the index of the pilot signal; and the determining an index of the data processing mode based on an index of the pilot signal is specifically:

determining, based on the index of the pilot signal, a value of a bit that is corresponding to each of the plurality of processing modes and that is in the index of the pilot signal, and determining an index of each data processing mode.

Optionally, in an implementation of the second aspect, the data processing mode includes first to $g^{th}$ processing modes, and g is an integer greater than or equal to 2; and the determining an index of the data processing mode based on an index of the pilot signal is specifically:

determining a value y based on the index of the pilot signal; and determining the index of the data processing mode based on the value y, where the value y and the index of the data processing mode have the following relationship:

$$y = \sum_{i=1}^{i=g-1} x_i \prod_{j=i+1}^{j=g} N_j + x_g$$

where $x_g$ indicates an index of the $g^{th}$ processing mode, $x_i$ indicates an index of an $i^{th}$ processing mode, and $N_j$ indicates a quantity of $j^{th}$ processing modes that are selectable.

Optionally, in an implementation of the second aspect, the determining a value y based on the index of the pilot signal is specifically:

when a quantity K of pilot signals that are selectable is equal to a product of quantities of the first to the $g^{th}$ processing modes that are selectable, determining the value y based on a condition that meets the following formula:

$$y=(f-S)\bmod K$$

where S is a value corresponding to the at least one of: the cell identifier of the terminal device, the identifier of the terminal device, the time domain resource information, and the frequency domain resource information.

Optionally, in an implementation of the second aspect, the determining a value y based on the index of the pilot signal is specifically:

when the quantity K of pilot signals that are selectable is greater than the product of the quantities of the first to the $g^{th}$ processing modes that are selectable, determining the value y based on a condition that meets the following formula:

$$y=(\lfloor f/q \rfloor -S)\bmod K$$

where S is the value corresponding to the at least one of: the cell identifier of the terminal device, the identifier of the terminal device, the time domain resource information, and the frequency domain resource information, q is a constant, p belongs to [0, q−1], mod indicates modulo processing, and $\lfloor \cdot \rfloor$ indicates rounding down.

According to a third aspect, a terminal device is provided. The terminal device includes a processor and a transceiver, and may be configured to perform the method in the first aspect or any one of the optional implementations of the first aspect.

According to a fourth aspect, a communications device is provided. The communications device includes a processor and a transceiver, and may be configured to perform the method in the second aspect or any one of the optional implementations of the second aspect.

According to a fifth aspect, a computer storage medium is provided, where the computer storage medium stores program code, and the program code may be used to instruct to perform the method in the first aspect and the second aspect or any one of the optional implementations of the first aspect and the second aspect.

DETAILED DESCRIPTION

Figure 1:
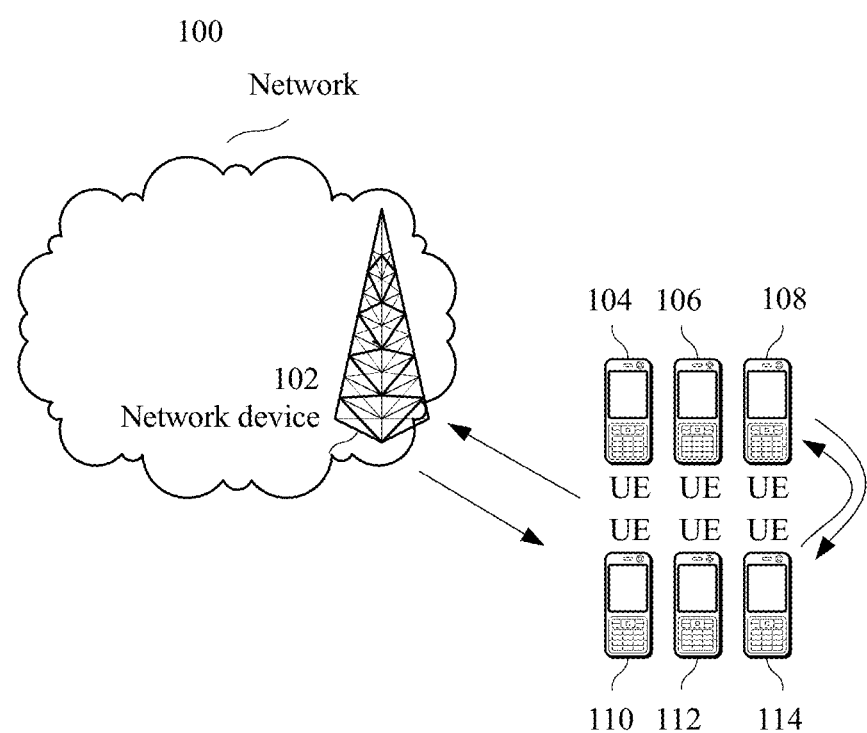
FIG. 1 is a diagram of an application scenario according to an embodiment of this application.

The following describes the technical solutions in the embodiments of this application with reference to the accompanying drawings in the embodiments of this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an executable thread, a program, and/or a computer. As shown in figures, both a computing device and an application that runs on a computing device may be components. One or more components may reside within a process and/or an executable thread, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that, the technical solutions in the embodiments of this application may be applied to various communications systems, such as a Global System for Mobile Communications (GSM) system, a Code Division Multiple Access (CDMA) system, a Wideband Code Division Multiple Access (WCDMA) system, a Long Term Evolution (LTE) system, an LTE frequency division duplex (FDD) system, an LTE time division duplex (TDD) system, a Universal Mobile Telecommunications System (UMTS), a future 5G communications system.

In the embodiments of this application, a terminal device may also be called user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved PLMN network.

The network device in the embodiments of this application may be a device configured to communicate with the terminal device. For example, the network device may be a base transceiver station (BTS) in a GSM system or a CDMA system, may be a NodeB (NB) in a WCDMA system, or may be an evolved NodeB (eNB or eNodeB) in an LTE system; or the network device may be a relay station, an access point, an in-vehicle device, a wearable device, a network side device in a future 5G network, or a network device in a future evolved PLMN network.

A future wireless communications system is significantly different from an existing communications system because of existence of a large quantity of connections. The large quantity of connections means that more resources need to be consumed for access of UE and that more resources need to be consumed for transmitting scheduling signaling related to data transmission of a terminal device.

FIG. 1 is a schematic architectural diagram of a communications system to which an embodiment of this application is applied. As shown in FIG. 1, the communications system 100 may include a network device 102 and terminal devices 104 to 114 (referred to as UE in the figure), and the network device and the terminal device are connected in a wireless manner, a wired manner, or another manner.

A network in the embodiments of this application may be a public land mobile network (PLMN), a D2D network, an M2M network, or another network. FIG. 1 is merely a simplified schematic diagram used as an example. The network may further include another network device not shown in FIG. 1.

A solution provided in this application may be applied to grant free transmission. The grant free transmission supports a plurality of services in a future network, such as a machine type communication (MTC) service or an ultra-reliable and low latency communication (URLLC) service, so as to enable low latency, ultra-reliable service transmission. The grant free transmission may be specific to uplink data transmission. A person skilled in the art may know that the grant free transmission may also have another name, such as spontaneous access, spontaneous multiple access, or contention-based multiple access.

In addition to communication between a terminal device and a network device, for example, as shown in FIG. 1, the embodiments of this application may be applied to communication between a terminal device and another terminal device, and in this case, the embodiments of this application may be applied to device to device (D2D) transmission.

It should be understood that, a pilot signal mentioned in the embodiments of this application may also be referred to as a reference signal, and is a signal provided by a transmit end for a receive end for channel estimation, channel detection, or channel state detection.

It should be understood that, in the embodiments of this application, an index of the pilot signal means that the pilot signal may be determined by using the index.

Optionally, in the embodiments of this application, the pilot signal may be directly determined by using the index; alternatively, the pilot signal may be determined by using the index and other information.

For example, the index of the pilot signal may be obtained based on an index of a data processing mode, and the pilot signal may be determined based on the index of the pilot signal and an identifier of the terminal device.

For example, the index of the pilot signal may be obtained based on the index of the data processing mode and the identifier of the terminal device, and the pilot signal may be determined based on the index of the pilot signal and a cell identifier of the terminal device.

Similarly, the index of the data processing mode also means that the data processing mode is searched by using the index. Specifically, the data processing mode may be directly determined by using the index; alternatively, the data processing mode may be determined by using the index and other information.

The index mentioned in the embodiments of this application may also be referred to as a number, a search parameter, or the like.

Figure 2:
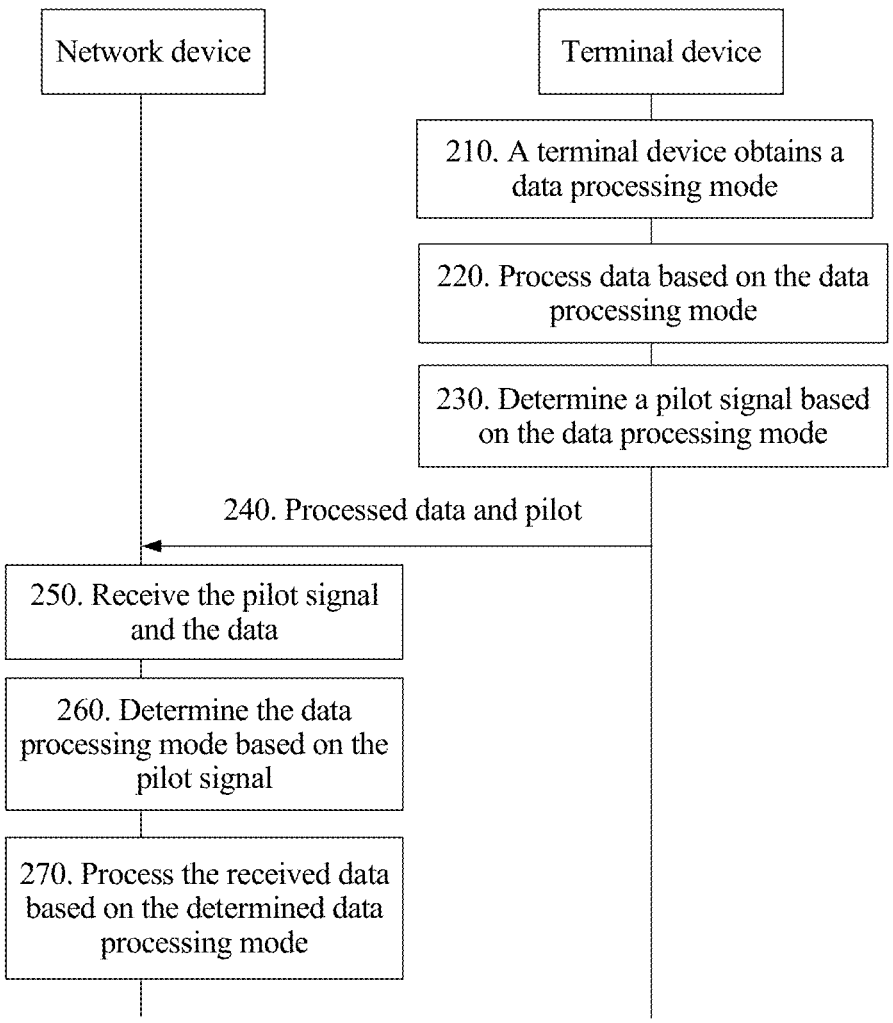
FIG. 2 is a schematic flowchart of an information transmission method according to an embodiment of this application.

FIG. 2 is a schematic flowchart of an information transmission method 200 according to an embodiment of this application.

In the method shown in FIG. 2, a transmit end of data and a pilot signal may be a terminal device or a network device, and a receive end of the data and the pilot signal may be a terminal device or a network device.

The following describes an example in which the transmit end of the data and the pilot signal is a terminal device, and the receive end of the data and the pilot signal is a network device, but this embodiment of this application is not limited thereto. For example, the transmit end of the data and the pilot signal is a terminal device, and the receive end of the data and the pilot signal is another terminal device; in this case, this embodiment of this application may be applied to D2D transmission.

In 210, a terminal device obtains a data processing mode.

Optionally, in this embodiment of this application, the data processing mode may include a modulation and coding mode.

In this embodiment of this application, the modulation and coding mode may refer to a modulation and code scheme (MCS).

Optionally, the MCS may indicate a modulation order, a transport block size (TBS), and a redundancy version (RV).

The TBS may refer to a quantity of information bits transferred within a specific time-frequency resource block size. The redundancy version $rv_{idx}$ is used to specify an output bit in a channel coding process. The transport block size and the redundancy version $rv_{idx}$ determine a specific channel coding mode, for example, a bit rate. The modulation order determines a specific modulation method.

Optionally, the MCS mentioned in this embodiment of this application may be selected from Table 1.

TABLE 1

| MCS index $I_{MCS}$ | Modulation order $Q'_m$ | TBS index $I_{TBS}$ | Redundancy version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |

In this table, each MCS index is corresponding to a combination of the modulation order $Q'_m$, the TBS index $I_{TBS}$, and the redundancy version $rv_{idx}$.

Optionally, a correspondence between the TBS index and the transport block size may be indicated by a TBS table. Table 2 is an example of the TBS table. The TBS (example values such as 8 or 24 in the table) may be determined based on a transmission resource (1RB or 2RB used as an example in the table) and the index of the TBS.

TABLE 2

| TBS index $I_{TBS}$ | 1RB | 2RB | . . . |
|---|---|---|---|
| 0 | 8 | 24 | |
| 1 | 16 | 40 | |
| 2 | 24 | 56 | |
| 3 | 32 | 72 | |
| 4 | 48 | 108 | |
| 5 | 64 | 132 | |
| 6 | 80 | 172 | |
| 7 | 96 | 200 | |

Optionally, in this embodiment of this application, in addition to the modulation and coding mode in a form of the MCS, a channel coding mode may be selected from a set of channel coding modes, and a modulation method may be selected from a set of modulation methods; in this case, the channel coding mode and the modulation method each may have their respective indexes.

It should be understood that, in this embodiment of this application, in addition to directly obtaining, through search, the TBS and the redundancy version based on an index of the modulation and coding mode or an index of the channel coding mode, the bit rate may be directly obtained, through search, based on the index of the modulation and coding mode or the index of the channel coding mode.

Optionally, the data processing mode mentioned in this embodiment of this application may further include at least one of the following processing modes: an interleaving mode and a spreading mode.

Optionally, in this embodiment of this application, different interleaving modes may be distinguished by using interleaving patterns; in other words, different interleaving patterns indicate different interleaving modes.

Optionally, in this embodiment of this application, different spreading modes may be distinguished by using spreading codes; in other words, different spreading codes indicate different spreading modes.

It should be understood that, after the terminal device selects the foregoing data processing modes, it does not mean that another data processing mode is not selected.

For example, in 210, the data processing mode obtained by the terminal device includes only the spreading mode, but the terminal device may still select the modulation and coding scheme. The modes included in the foregoing data processing modes represent data processing modes used to determine a pilot signal.

Optionally, in this embodiment of this application, the terminal device may select the data processing mode based on a plurality of modes.

In an implementation, the terminal device may determine the data processing mode based on state information of a channel between receive ends of the data.

Optionally, the terminal device may estimate state information of a channel between the terminal device and the receive end of the data based on a reference signal sent by the receive end of the data.

In an implementation, the terminal device may select a current data processing mode based on a data processing mode corresponding to the receive end of the data when the receive end of the data previously transmits data and information (for example, NACK/ACK) fed back by the receive end for the previously transmitted data.

For example, the modulation and coding modes previously used by the terminal device to process and send the data of the receive end include a mode corresponding to an index 1, a mode corresponding to an index 2, and a mode corresponding to an index 3, and if the ratio of the ACK fed back by the receive end for using the mode corresponding to the index 1 is the highest, the terminal device may process data by using the mode corresponding to the index 1.

In an implementation, the terminal device may determine, based on a broadcast message or a unicast message of the receive end of the data, a data processing mode used by the data.

Specifically, the receive end of the data may notify in advance the terminal device of a selection range within which the data processing mode that can be used to transmit data are selected.

It should be understood that, that the data processing mode may be determined based on the state information of the channel between the receive ends of the data, the data processing mode corresponding to the previously transmitted data, and the NACK/ACK fed back by the receive end, or the broadcast message or the unicast message of the receive end of the data is described in the foregoing.

It should be understood that, in this embodiment of this application, the state information of the channel between the receive ends of the data, the data processing mode corresponding to the previously transmitted data, the NACK/ACK fed back by the receive end, and the broadcast message or the unicast message of the receive end of the data may be combined for use.

Specifically, any two of following may be used to select the data processing mode: the state information of the channel between the receive ends of the data, the data processing mode corresponding to the data that is previously transmitted by the receive end of the data, the NACK/ACK fed back by the receive end, and the broadcast message or the unicast message of the receive end of the data.

Alternatively, the data processing mode is selected based on all of the following: the state information of the channel between the receive ends of the data, the data processing mode corresponding to the data that is previously transmitted by the receive end of the data, the NACK/ACK fed back by the receive end, and the broadcast message or the unicast message of the receive end of the data.

Therefore, in this embodiment of this application, the terminal device determines at least one of the data processing modes, and determines a preferable modulation and coding mode based on the state information of the channel between the receive ends of the data, the data processing mode corresponding to the previously transmitted data, the NACK/ACK fed back by the receive end, and the broadcast message or the unicast message of the receive end of the data, so as to improve transmission efficiency.

For example, the receive end of the data may broadcast a selection range of the data processing mode, and the terminal device may select a data processing mode from the selection range of the data processing mode based on a status of the channel between the terminal device and the receive end.

In 220, the terminal device processes data based on the data processing mode.

Figure 3:
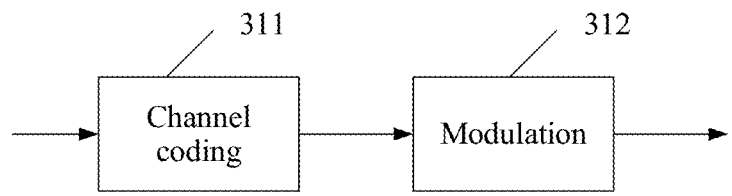
FIG. 3 is a schematic flowchart of an information transmission method according to an embodiment of this application.

For example, as shown in FIG. 3, after determining the MCS, in 311, channel coding may be performed on data based on a coding mode indicated by the MCS to obtain a coded bit; and in 312, the coded bit may be modulated based on the modulation order indicated by the MCS to obtain a modulation symbol.

Figure 4:
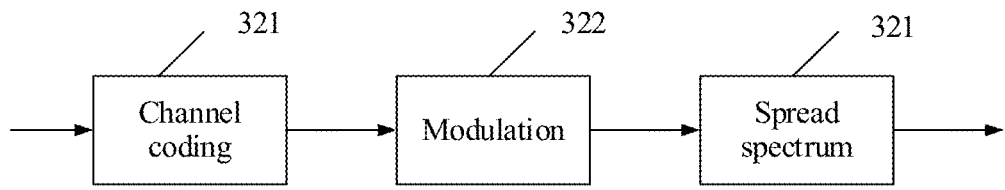
FIG. 4 is a schematic flowchart of an information transmission method according to an embodiment of this application.

For example, as shown in FIG. 4, after the MCS and the spreading mode are determined, in 312, channel coding may be performed on data based on the coding mode indicated by the MCS to obtain the coded bit; in 322, the coded bit may be modulated based on the modulation order indicated by the MCS to obtain the modulation symbol; and in 323, spreading may be performed on the modulated symbol based on a determined spreading mode to obtain a modulation symbol after spreading, for example, spreading may be performed by using a ZC code or a PN code.

Figure 5:
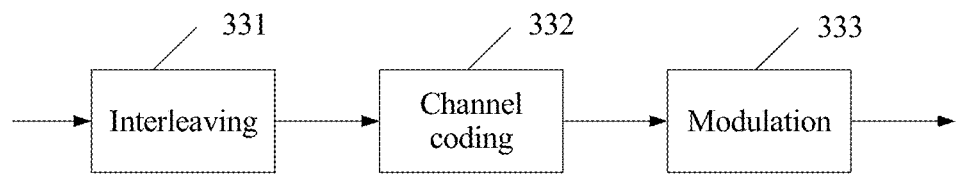
FIG. 5 is a schematic flowchart of an information transmission method according to an embodiment of this application.

For example, as shown in FIG. 5, after the interleaving mode and the MCS are determined, in 331, the data may be interleaved based on the determined interleaving mode to obtain interleaved data; in 332, channel coding may be performed on the interleaved data based on the coding mode indicated by the determined MCS to obtain the coded bit; and in 333, the coded bit may be modulated based on the modulation order indicated by the determined MCS to obtain the modulation symbol.

Figure 6:
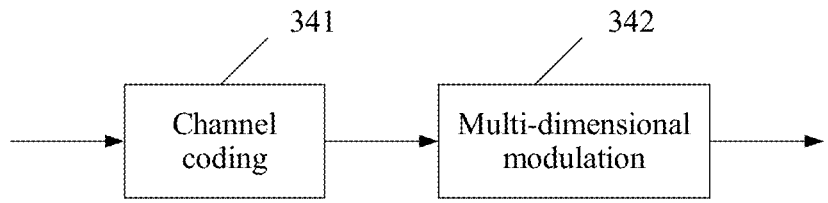
FIG. 6 is a schematic flowchart of an information transmission method according to an embodiment of this application.

For example, as shown in FIG. 6, after the channel coding mode and a multi-dimensional modulation method are determined, in 341, channel coding may be performed on the data based on a mode indicated by the channel coding mode to obtain the coded bit; and in 342, the coded bit may be modulated based on the determined multi-dimensional modulation method to obtain the modulation symbol.

In this embodiment of this application, a non-orthogonal multiple access technology may be used to implement multi-dimensional modulation. Therefore, the multi-dimensional modulation method may be sparse code multiple access (SCMA).

Specifically, the SCMA is a non-orthogonal multiple access technology, and certainly, a person skilled in the art may not refer to this technology as the SCMA, and may refer to this technology as another technical term.

It should be understood that, in addition to the data processing mode shown in FIG. 3 to FIG. 6, this embodiment of this application may have another implementation. For example, the interleaving mode, the channel coding mode, and the multi-dimensional modulation method may be determined, and data is processed based on the determined mode. For another example, in FIG. 6, interleaving may be performed after modulation.

In 230, the terminal device obtains a pilot signal based on the data processing mode.

Optionally, in this embodiment of this application, the terminal device may obtain the pilot signal based on a mapping relationship between the data processing mode and the pilot signal.

Optionally, in this embodiment of this application, the terminal device may determine a unique pilot signal based on a specific data processing mode or a specific combination of data processing modes, and the mapping relationship between the data processing mode and the pilot signal.

Optionally, the mapping relationship between the data processing mode and the pilot signal may be a mapping relationship between an index of the data processing mode and an index of the pilot signal.

Optionally, in this embodiment of this application, the mapping relationship between the data processing mode and the pilot signal may be implemented by using a table.

For example, the table may directly present the mapping relationship between the data processing mode and the pilot signal, that is, the pilot signal may be directly found by searching the table.

For example, the table may present the mapping relationship between the index of the data processing mode and the index of the pilot signal; that is, the index of the data processing mode may be used to find the index of the pilot signal by searching the table, so that the pilot signal may be obtained by using the index of the pilot signal.

Optionally, in this embodiment of this application, the mapping relationship between the data processing mode and the pilot signal may be implemented by using a formula.

That "according to a formula" described in the embodiments of this application can be understood as that the formula conforms to a condition or a law expressed by the formula; and in an implementation process, in addition to a form of a formula, another expression form may be used for presentation.

For example, the index of the data processing mode may be used to obtain the index of the pilot signal by using the formula, so that the pilot signal may be determined by using the index of the pilot signal.

For example, the index of the data processing mode may be used to directly obtain the pilot signal by using the formula.

Optionally, in this embodiment of this application, the index of the pilot signal may include values of a specific quantity of bits, and optionally, the quantity of bits is related to a quantity of pilots.

Optionally, the index of the pilot signal is a number of a t system, and optionally, a value of t may be 2 or 10.

Optionally, the index of the data processing mode is corresponding to all or some bits of the index of the pilot signal, that is, the terminal device may determine values of all or some bits of the index of the pilot signal based on the index of the data processing mode.

Optionally, when the index of the data processing mode is corresponding to the values of some bits of the index of the pilot signal, other bits may be corresponding to at least one of: a cell identifier of the terminal device, an identifier of the terminal device, time domain resource information, and frequency domain resource information. For example, values of other bits may be determined by an index used to indicate the at least one of: the cell identifier of the terminal device, the identifier of the terminal device, the time domain resource information, and the frequency domain resource information.

The time domain resource information is optionally information about a time domain resource allocated for transmitting data, or information about a time domain resource allocated for a latest data transmission. The time domain resource information may include a frame number and a slot number.

The frequency domain resource information is optionally information about a frequency domain resource allocated for transmitting to-be-sent data, or information about a frequency domain resource allocated for the latest data transmission. The frequency domain resource information may include a sub-band number.

The cell identifier of the terminal device is optionally an identifier of a management area to which the terminal device belongs, where the management area may be a physical cell, or a hypercell (which is a virtual cell).

The identifier of the terminal device is optionally information used to identify the terminal device, for example, an international mobile subscriber identity (IMSI), a temporary mobile station identity (TMSI), or an international mobile equipment identity (IMEI).

For example, the index of the pilot signal is a 4-bit number, where the fourth bit and the third bit of the index of the pilot signal from a low order to a high order may be corresponding to the modulation and coding mode, and the first bit and the second bit may be a corresponding value of at least one of: the cell identifier of the terminal device, the identifier of the terminal device, the time domain resource information, and the frequency domain resource information. It is assumed that an index of the modulation and coding mode is 11, and the corresponding value of the at least one of: the cell identifier of the terminal device, the identifier of the terminal device, the time domain resource information, and the frequency domain resource information is 00. The index of the pilot signal is 1100.

Optionally, when the data processing mode includes a plurality of processing modes, different processing modes may be corresponding to different bits in the index of the pilot signal. Optionally, the bits corresponding to the different processing modes do not overlap at all.

For example, the index of the pilot signal is a 5-bit number, where the fourth bit and the fifth bit of the index of the pilot signal from a low order to a high order may be corresponding to the modulation and coding mode, the second bit and the third bit may be corresponding to the spreading mode, and the first bit may be determined by another factor, for example, may be determined by the index used to indicate the at least one of: the cell identifier of the terminal device, the identifier of the terminal device, the time domain resource information, and the frequency domain resource information. It is assumed that the index of the modulation and coding mode is 11, an index of the spreading mode is 00, and the corresponding value of the at least one of: the cell identifier of the terminal device, the identifier of the terminal device, the time domain resource information, and the frequency domain resource information is 1. The index of the pilot signal is 11001.

For another example, the index of the pilot signal is a 5-bit number, where the fifth bit of the index of the pilot signal from a low order to a high order is corresponding to the channel coding mode, that is, a specific value is determined by an index of the channel coding mode, the fourth bit is corresponding to the modulation method, that is, a specific value is determined by an index of the modulation method, the second bit and the third bit are corresponding to the spreading mode, that is, a specific value is determined by the index of the spreading mode, and the last bit may be determined by another factor, for example, may be determined by the index used to indicate the at least one of: the cell identifier of the terminal device, the identifier of the terminal device, the time domain resource information, and the frequency domain resource information. It is assumed that the index of the channel coding mode is 1, the index of the modulation method is 0, the index of the spreading mode is 11, and the corresponding value of the at least one of the time domain resource information and the frequency domain resource information is 1. The index of the pilot signal is 10111.

For another example, the index of the pilot signal is a 5-bit number, where the fourth bit and the fifth bit of the index of the pilot signal from a low order to a high order may be corresponding to the interleaving mode, the second bit and the third bit may be corresponding to the spreading mode, and the first bit may be determined by another factor, for example, may be determined by the index used to indicate the at least one of: the cell identifier of the terminal device, the identifier of the terminal device, the time domain resource information, and the frequency domain resource information. It is assumed that the index of the interleaving mode is 11, an index of the spreading mode is 00, and the corresponding value of the at least one of: the cell identifier of the terminal device, the identifier of the terminal device, the time domain resource information, and the frequency domain resource information is 1. The index of the pilot signal is 11001.

Optionally, bits that are corresponding to different processing modes and that are in the index of the pilot signal may be arranged in a centralized manner.

For example, the index of the pilot signal is a 5-bit number, where the fourth bit and the fifth bit of the index from a low order to a high order are corresponding to the modulation and coding scheme, the second bit and the third bit are corresponding to the spreading mode, and the last bit is corresponding to other information, for example, the cell identifier of the terminal device, the identifier of the terminal device, the time domain resource information, or the frequency domain resource information. It is assumed that the index of the modulation and coding mode is 11, an index of the spreading mode is 00, and the corresponding value of the at least one of: the cell identifier of the terminal device, the identifier of the terminal device, the time domain resource information, and the frequency domain resource information is 1. The index of the pilot signal is 11001.

Optionally, the bits corresponding to at least two processing modes in the index of the pilot signal may be arranged in a cross manner.

For example, the index of the pilot signal is a 5-bit number, where the second bit and the fourth bit from a low order to a high order are corresponding to the modulation and coding mode, the third bit and the fifth bit may be corresponding to the interleaving mode, and the last bit is corresponding to other information. It is assumed that the index of the modulation and coding mode is 11, the index of the interleaving mode is 00, and the corresponding value of the at least one of: the cell identifier of the terminal device, the identifier of the terminal device, the time domain resource information, and the frequency domain resource information is 1. The index of the pilot signal is 01011.

Certainly, when other information is corresponding to a plurality of bits, the bits may also be arranged in a cross manner.

For ease of understanding, the following describes several manners of determining the index of the pilot signal based on the index of the data processing mode, where bits corresponding to different processing modes may be arranged in a centralized manner, that is, are not arranged in a cross manner with the bit corresponding to another mode.

In the following manners 1 to 6, a specific data processing mode is corresponding to a specific bit of the index of the pilot signal. However, it should be understood that, this does not mean that in an execution process, the terminal device needs to make a value of a bit of the index of the pilot signal directly correspond to the index of the data processing mode, but may implement a correspondence between the specific data processing mode and the specific bit of the index of the pilot signal by using a formula.

It should be understood that locations of bits in the following manners 1 to 6 are arranged in an order from a low order to a high order.

Manner 1

In this manner, the data processing mode includes the modulation and coding mode, and the terminal device may determine an index f of the pilot signal according to the following formula 1:

$$f = m \cdot t^{N_0 - 1} + S \cdot t^{N_s - 1} \quad \text{Formula 1}$$

where m is an index of the modulation and coding mode, f is a value in a t system, $N_0$ is a location of a start bit in bits that are corresponding to m and that are in f, $N_s$ is a location of a start bit in bits that are corresponding to S and that are in f, and S is a value corresponding to the at least one of: the cell identifier of the terminal device, the identifier of the terminal device, the time domain resource information, and the frequency domain resource information.

Optionally, t is 2 or 10, and f may be a binary number or a decimal number.

Optionally, a specific relationship between sizes of $N_0$ and $N_s$ is not limited. For example, $N_0$ may be greater than $N_s$, or $N_0$ may be less than or equal to $N_s$.

Optionally, the modulation and coding mode is the MCS.

Manner 2

In this manner, the data processing mode includes the modulation and coding mode and the spreading mode, and the terminal device may determine an index f of the pilot signal according to the following formula 2:

$$f = m \cdot t^{N_0 - 1} + c_1 \cdot t^{N_1 - 1} + S \cdot t^{N_s - 1} \quad \text{Formula 2}$$

where m is an index of the modulation and coding mode, $c_1$ is an index of the spreading mode, f is a value in a t system, $N_0$ is a location of a start bit in bits that are corresponding to m and that are in f, $N_1$ is a location of a start bit in bits that are corresponding to the $c_1$ and that are in f, $N_s$ is a location of a start bit in bits that are corresponding to S and that are in f, and S is a value corresponding to the at least one of: the cell identifier of the terminal device, the identifier of the terminal device, the time domain resource information, and the frequency domain resource information.

Optionally, a specific relationship between sizes of $N_0$, $N_1$, and $N_s$ is not limited. $N_0$ may be greater than $N_1$, and $N_1$ may be greater than $N_s$; or, $N_0$ may be greater than $N_s$, and $N_s$ may be greater than $N_1$; or, $N_1$ may be greater than $N_s$, and $N_s$ may be greater than $N_0$; or $N_1$ may be greater than $N_0$, $N_0$ may be greater than $N_s$; or $N_s$ may be greater than $N_0$, and $N_0$ may be greater than $N_1$; or, $N_s$ may be greater than $N_1$, and $N_1$ may be greater than $N_0$.

Optionally, t is 2 or 10, and f may be a binary number or a decimal number.

Optionally, the modulation and coding mode is the MCS.

Manner 3

In this manner, the data processing mode includes the modulation and coding mode and the interleaving mode, and the terminal device may determine an index f of the pilot signal according to the following formula 3:

$$f = m \cdot t^{N_0 - 1} + c_2 \cdot t^{N_2 - 1} + S \cdot t^{N_s - 1} \quad \text{Formula 3}$$

where m is an index of the modulation and coding mode, $c_2$ is an index of the interleaving mode, f is a value in a t system, $N_0$ is a location of a start bit in bits that are corresponding to m and that are in f, $N_2$ is a location of a start bit in bits that are corresponding to the $c_2$ and that are in f, $N_s$ is a location of a start bit in bits that are corresponding to S and that are in f, and S is a value corresponding to the at least one of: the cell identifier of the terminal device, the identifier of the terminal device, the time domain resource information, and the frequency domain resource information.

Optionally, a specific relationship between sizes of $N_0$, $N_2$ and $N_s$ is not limited. $N_0$ may be greater than $N_2$, and $N_2$ may be greater than $N_s$; or, $N_0$ may be greater than $N_s$, and $N_s$ may be greater than $N_2$; or, $N_2$ may be greater than $N_s$, and $N_s$ may be greater than $N_0$; or $N_2$ may be greater than $N_0$, $N_0$ may be greater than $N_s$; or $N_s$ may be greater than $N_0$, and $N_0$ may be greater than $N_2$; or, $N_s$ may be greater than $N_2$, and $N_2$ may be greater than $N_0$.

Optionally, t is 2 or 10, and f may be a binary number or a decimal number.

Optionally, the modulation and coding mode is the MCS.

Manner 4

In this manner, the data processing mode includes the modulation and coding mode, the spreading mode, and the interleaving mode, and the terminal device may determine an index f of the pilot signal according to the following formula 4:

$$f = m \cdot t^{N_0 - 1} + c_1 \cdot t^{N_1 - 1} + c_2 \cdot t^{N_2 - 1} + S \cdot t^{N_s - 1} \quad \text{Formula 4}$$

where m is an index of the modulation and coding mode, $c_1$ is an index of the spreading mode, $c_2$ is an index of the interleaving mode, f is a value in a t system, $N_0$ is a location of a start bit in bits that are corresponding to m and that are in f, $N_1$ is a location of a start bit in bits that are corresponding to the $c_1$ and that are in the f, $N_2$ is a location of a start bit in bits that are corresponding to the $c_2$ and that are in f, $N_s$ is a location of a start bit in bits that are corresponding to S and that are in f, and S is a value corresponding to the at least one of: the cell identifier of the terminal device, the identifier of the terminal device, the time domain resource information, and the frequency domain resource information.

Optionally, a relationship between sizes of $N_0$, $N_2$, $N_1$, and $N_s$ in this embodiment of this application is not specifically limited, but $N_0$, $N_2$, $N_1$, and $N_s$ are not equal to each other.

Optionally, t is 2 or 10, and f may be a binary number or a decimal number.

Optionally, the modulation and coding mode is the MCS.

Manner 5

In this manner, the data processing mode includes the channel coding mode and the multi-dimensional modulation method, and the terminal device may determine an index f of the pilot signal according to the following formula 5:

$$f = m_a \cdot t^{N_a - 1} + m_b \cdot t^{N_b - 1} + S \cdot t^{N_s - 1} \quad \text{Formula 5}$$

where $m_a$ is an index of the channel coding mode, $m_b$ is an index of the multi-dimensional modulation method, f is a value in a t system, $N_a$ is a location of a start bit in bits that are corresponding to the $m_a$ and that are in f, $N_b$ is a location of a start bit in bits that are corresponding to the $m_b$ and that are in f, $N_s$ is a location of a start bit in bits that are corresponding to S and that are in f, and S is a value corresponding to the at least one of: the cell identifier of the terminal device, the identifier of the terminal device, the time domain resource information, and the frequency domain resource information.

Optionally, a relationship between sizes of $N_a$, $N_b$, and $N_s$ in this embodiment of this application is not specifically limited, but $N_a$, $N_b$, and $N_s$ are not equal to each other.

Optionally, t is 2 or 10, and f may be a binary number or a decimal number.

Optionally, the modulation and coding mode is the MCS.

Manner 6

In this manner, the data processing mode includes a channel coding mode, a multi-dimensional modulation method, and the interleaving mode; and the terminal device may determine an index f of the pilot signal according to the following formula 6:

$$f = m_a \cdot t^{N_a} + m_b \cdot t^{N_b} + c_2 \cdot t^{N_2} + S \cdot t^{N_s - 1} \quad \text{Formula 6}$$

where $m_a$ is an index of the channel coding mode, $m_b$ is an index of the multi-dimensional modulation method, $c_2$ is an index of the interleaving mode, f is a value in a t system, $N_a$ is a location of a start bit in bits that are corresponding to the $m_a$ and that are in f, $N_b$ is a location of a start bit in bits that are corresponding to the $m_b$ and that are in f, $N_2$ is a location of a start bit in bits that are corresponding to the $c_2$ and that are in f, $N_s$ is a location of a start bit in bits that are corresponding to S and that are in f, and S is a value corresponding to the at least one of: the cell identifier of the terminal device, the identifier of the terminal device, the time domain resource information, and the frequency domain resource information.

Optionally, a relationship between sizes of $N_a$, $N_b$, $N_2$, and $N_s$ in this embodiment of this application is not specifically limited, but $N_a$, $N_b$, $N_2$, and $N_s$ are not equal to each other.

Optionally, t is 2 or 10, and f may be a binary number or a decimal number.

Optionally, S in the foregoing manners may be the index used to indicate the at least one of: the cell identifier of the terminal device, the identifier of the terminal device, the time domain resource information, and the frequency domain resource information.

It should be understood that, the foregoing has described, by using examples, several manners for determining the index of the pilot signal, but it should be understood that, this embodiment of this application is not limited thereto. For example, in manners A, B, C and D, the modulation and coding mode may be divided into the channel coding mode and the modulation method, that is, the index of the pilot signal may be determined based on the index of the channel coding mode and the index of the modulation and coding mode (may further be determined based on the index of the interleaving mode and/or the index of the spreading mode), where the channel coding mode and the modulation and coding mode are corresponding to different bits of the index of the pilot signal.

It should be further understood that, in addition to a formula, the embodiment of this application includes another manner for implementing the correspondence between the specific data processing mode and the specific bit of the index of the pilot signal, so as to determine the index of the pilot signal.

Optionally, the data processing mode includes first to $g^{th}$ processing modes, and g is an integer greater than or equal to 2; and the terminal device may determine the index of the pilot signal based on a value y, where the value y is determined according to the following formula 7:

$$y = \sum_{i=1}^{i=g-1} x_i \prod_{j=i+1}^{j=g} N_j + x_g \qquad \text{Formula 7}$$

where $x_g$ indicates an index of the $g^{th}$ processing mode, $x_i$ indicates an index of an $i^{th}$ processing mode, and $N_j$ indicates a quantity of $j^{th}$ processing modes that are selectable.

In other words, the terminal device may multiply the index of the $i^{th}$ processing mode by quantities of processing modes that are selectable from an $(i+1)^{th}$ processing mode to the $g^{th}$ processing mode to obtain a first value, where 1 to g−1 are traversed for i; the value y is obtained by adding the first value and the index of the $g^{th}$ processing mode; and the index of the pilot signal is determined based on the value y.

Optionally, the terminal device may directly use the index of the data processing mode to obtain the value y according to the foregoing formula 7.

Alternatively, the terminal device may store a direct correspondence between the index of the data processing mode and the value y, for example, may store the direct correspondence by using a table, where the correspondence may be obtained according to formula 7. For example, the correspondence is shown in Table 3.

TABLE 3

| y | MCS index | Index of a spreading mode |
|---|---|---|
| 0 | 0 | 0 |
| 1 | 0 | 1 |
| 2 | 0 | 2 |
| 3 | 0 | 3 |
| 4 | 1 | 0 |
| 5 | 1 | 1 |
| 6 | 1 | 2 |
| 7 | 1 | 3 |

Optionally, when a quantity K of pilot signals that are selectable is equal to a product of the quantities of the first to the $g^{th}$ processing modes that are selectable, the index of the pilot signal may be determined according to the following formula:

$$f=(y+S) \bmod K \qquad \text{Formula 8}$$

where S is a value corresponding to the at least one of: the cell identifier of the terminal device, the identifier of the terminal device, the time domain resource information, and the frequency domain resource information.

Optionally, when a quantity K of pilot signals that are selectable is equal to a product of the quantities of the first to the $g^{th}$ processing modes that are selectable, the index of the pilot signal may be determined according to the following formula:

$$f=(q \cdot y+p+S) \bmod K \qquad \text{Formula 9}$$

where S is a value corresponding to the at least one of: the cell identifier of the terminal device, the identifier of the terminal device, the time domain resource information, and the frequency domain resource information, q is a constant, and p belongs to [0, q−1].

Optionally, q is determined based on a ratio of the quantity of pilot signals that are selectable to the product of the quantities of the first to the $g^{th}$ processing modes that are selectable. For example, q is equal to a rounded-up value or a rounded-down value of a ratio of the quantity of pilot signals that are selectable to the product of the quantities of the first to the $g^{th}$ processing modes that are selectable.

It should be understood that, the first to the $g^{th}$ processing modes mentioned above do not mean that the data processing modes need to be sorted. The sequence herein is only for ease of description, and the sequence should not be limited in the embodiment of this application. For example, the data processing mode includes the modulation and coding mode and the interleaving mode, and the modulation and coding mode may be referred to as a first processing mode, and the interleaving mode may be referred to as a second processing mode; alternatively, the interleaving mode may be referred to as the first processing mode, and the modulation and coding mode may be referred to as the second processing mode.

For ease of understanding, the following provides description with reference to manners 7 to 16.

Manner 7

The data processing mode includes the modulation and coding mode and the spreading mode, and the terminal device may determine an index f of the pilot signal according to the following formula 10:

$$f=(m \cdot N_{c_1}+c_1+S) \bmod K \qquad \text{Formula 10}$$

where m is an index of the modulation and coding mode, $c_1$ is an index of the spreading mode, $N_{c_1}$ indicates a quantity of spreading modes that are selectable, K indicates a quantity of pilot signals that are selectable, and S is a value corresponding to the at least one of: the cell identifier of the terminal device, the identifier of the terminal device, the time domain resource information, and the frequency domain resource information.

Optionally, $K=N_{c_1}N_m$, where $N_m$ indicates a quantity of modulation and coding modes that are selectable, and $N_{c_1}$ indicates a quantity of spreading modes that are selectable.

Manner 8

The data processing mode further include the modulation and coding mode and the spreading mode, and the terminal device may determine an index f of the pilot signal according to the following formula 11:

$$f=(c_1 \cdot N_m+m+S) \bmod K \qquad \text{Formula 11}$$

where m is an index of the modulation and coding mode, $c_1$ is an index of the spreading mode, $N_m$ indicates a quantity of modulation and coding modes that are selectable, K indicates a quantity of pilot signals that are selectable, and S is a value corresponding to the at least one of: the cell identifier of the terminal device, the identifier of the terminal device, the time domain resource information, and the frequency domain resource information.

Optionally, $K=N_{c_1}N_m$, where $N_m$ indicates a quantity of modulation and coding modes that are selectable, and $N_{c_1}$ indicates a quantity of spreading modes that are selectable.

Manner 9

The data processing mode further include the modulation and coding mode and the spreading mode, and the terminal device may determine an index f of the pilot signal according to the following formula 12:

$$f=(mN_{c_1}q+c_1q+p+S) \bmod K \qquad \text{Formula 12}$$

where m is an index of the modulation and coding mode, $c_1$ is an index of the spreading mode, $N_{c_1}$ indicates a quantity of spreading modes that are selectable, S is a value corresponding to the at least one of: the cell identifier of the terminal device, the identifier of the terminal device, the time domain resource information, and the frequency domain resource information, q is a constant, p belongs to [0, q−1], and K indicates a quantity of pilot signals that are selectable.

Optionally, p may be randomly selected.

Optionally, $K>N_{c_1}N_m$, where $N_m$ indicates a quantity of modulation and coding modes that are selectable, and $N_{c_1}$ indicates a quantity of spreading modes that are selectable.

Manner 10

The data processing mode further include the modulation and coding mode and the spreading mode, and the terminal device may determine an index f of the pilot signal according to the following formula 13:

$$f=(c_1N_mq+mq+p+S)\bmod K \qquad \text{Formula 13}$$

where m is an index of the modulation and coding mode, $c_1$ is an index of the spreading mode, $N_m$ indicates a quantity of modulation and coding modes that are selectable, S is a value corresponding to the at least one of: the cell identifier of the terminal device, the identifier of the terminal device, the time domain resource information, and the frequency domain resource information, q is a constant, p belongs to [0, q−1], and K indicates a quantity of pilot signals that are selectable.

Optionally, p may be randomly selected.

Optionally, $K>N_{c_1}N_m$, where $N_m$ indicates a quantity of modulation and coding modes that are selectable, and $N_{c_1}$ indicates a quantity of spreading modes that are selectable.

Manner 11

The data processing mode includes the modulation and coding mode and the interleaving mode, and the terminal device may determine an index f of the pilot signal according to the following formula 14:

$$f=(m\cdot N_{c_2}+c_2+S)\bmod K \qquad \text{Formula 14}$$

where m is an index of the modulation and coding mode, $c_2$ is an index of the interleaving mode, $N_c$ indicates a quantity of interleaving modes that are selectable, K indicates a quantity of pilot signals that are selectable, and S is a value corresponding to the at least one of: the cell identifier of the terminal device, the identifier of the terminal device, the time domain resource information, and the frequency domain resource information.

Optionally, $K=N_{c_2}N_m$, where $N_m$ indicates a quantity of modulation and coding modes that are selectable, and $N_{c_2}$ indicates a quantity of interleaving modes that are selectable.

Manner 12

The data processing mode further include the modulation and coding mode and the interleaving mode, and the terminal device may determine an index f of the pilot signal according to the following formula 15:

$$f=(c_2\cdot N_m+m+S)\bmod K \qquad \text{Formula 15}$$

where m is an index of the modulation and coding mode, $c_2$ is an index of the interleaving mode, $N_m$ indicates a quantity of modulation and coding modes that are selectable, K indicates a quantity of pilot signals that are selectable, and S is a value corresponding to the at least one of: the cell identifier of the terminal device, the time domain resource information, and the frequency domain resource information.

Optionally, $K=N_{c_2}N_m$, where $N_m$ indicates a quantity of modulation and coding modes that are selectable, and $N_{c_2}$ indicates a quantity of interleaving modes that are selectable.

Manner 13

The data processing mode further include the modulation and coding mode and the interleaving mode, and the terminal device may determine an index f of the pilot signal according to the following formula 16:

$$f=(mN_{c_2}q+c_2q+p+S)\bmod K \qquad \text{Formula 16}$$

where m is an index of the modulation and coding mode, $c_2$ is an index of the interleaving mode, $N_{c_2}$ indicates a quantity of spreading modes that are selectable, q is a constant, p belongs to [0, q−1], K indicates a quantity of pilot signals that are selectable, and S is a value corresponding to the at least one of: the cell identifier of the terminal device, the identifier of the terminal device, the time domain resource information, and the frequency domain resource information.

Optionally, $K>N_{c_2}N_m$, where $N_m$ indicates m a quantity of modulation and coding modes that are selectable, and $N_{c_2}$ indicates a quantity of interleaving modes that are selectable.

Optionally, p may be randomly selected.

Manner 14

The data processing mode further include the modulation and coding mode and the interleaving mode, and the terminal device may determine an index f of the pilot signal according to the following formula 17:

$$f=(c_2N_mq+mq+p+S)\bmod K \qquad \text{Formula 17}$$

where m is an index of the modulation and coding mode, $c_2$ is an index of the interleaving mode, $N_m$ indicates a quantity of modulation and coding modes that are selectable, q is a constant, p belongs to [0, q−1], K indicates a quantity of pilot signals that are selectable, and S is a value corresponding to the at least one of: the cell identifier of the terminal device, the identifier of the terminal device, the time domain resource information, and the frequency domain resource information.

Optionally, $K>N_{c_2}N_m$, where $N_m$ indicates a quantity of modulation and coding modes that are selectable, and $N_{c_2}$ indicates a quantity of interleaving modes that are selectable.

Optionally, p may be randomly selected.

Manner 15

The data processing mode includes the modulation and coding mode and the interleaving mode, where the pilot signal includes a first parameter and a second parameter, and the index of the pilot signal includes a first index corresponding to the first parameter and a second index corresponding to the second parameter; and that the index of the pilot signal is determined based on the index of the data processing mode include:

determining a first index $f_1$ and a second index $f_2$ according to the following formulas 18 and 19:

$$f_1=(c_2+S)\bmod K \qquad \text{Formula 18}$$

$$f_2=m \qquad \text{Formula 19}$$

where m is an index of the modulation and coding mode, $c_2$ is an index of the interleaving mode, and S is a value corresponding to at least one of: the cell identifier of the terminal device, the identifier of the terminal device, the time domain resource information, and the frequency domain resource information.

Optionally, the pilot signal may be a ZC sequence. Then, the first parameter may be a base sequence, and the second parameter may be a cyclic shift parameter; or the first parameter may be a cyclic shift parameter, and the second parameter may be a base sequence.

Manner 16

The data processing mode includes the modulation and coding mode and the spreading mode, where the pilot signal includes a first parameter and a second parameter, and the index of the pilot signal includes a first index corresponding to the first parameter and a second index corresponding to the second parameter; and that the index of the pilot signal is determined based on the index of the data processing mode include:

determining a first index $f_1$ and a second index $f_2$ according to the following formulas 20 and 21:

$$f_1=(c_1+S) \bmod K \qquad \text{Formula 20}$$

$$f_2=m \qquad \text{Formula 21}$$

where m is an index of the modulation and coding mode, $c_1$ is an index of the spreading mode, and S is a value corresponding to at least one of: the cell identifier of the terminal device, the identifier of the terminal device, the time domain resource information, and the frequency domain resource information.

Optionally, the pilot signal may be a ZC sequence. Then, the first parameter may be a base sequence, and the second parameter may be a cyclic shift parameter; or the first parameter may be a cyclic shift parameter, and the second parameter may be a base sequence.

It should be understood that, another manner that a person skilled in the art may figure out with reference to the foregoing manners 7 to 16 falls within the protection scope of this application. For example, the modulation and coding mode may include a channel coding mode and a modulation method; and the index of the pilot signal is determined based on the index of the channel coding mode and the index of the modulation and coding mode according to a variation of the foregoing formula.

It should be understood that, in addition to the manners described above, in this embodiment of this application, the index of the pilot signal may further be determined in another manner.

In an implementation, the terminal device may directly store a correspondence between the index of the pilot signal and an index of at least one data processing mode. For example, the correspondence may be stored by using a table, and the terminal device may determine the index of the pilot signal by searching the table. The correspondence between the index of the pilot signal and the index of the at least one data processing mode may be shown in the following Table 4:

TABLE 4

| Index f of a pilot signal | MCS index | Index of a spreading mode |
|---|---|---|
| 0 | 0 | 0 |
| 1 | 0 | 1 |
| 2 | 0 | 2 |
| 3 | 0 | 3 |
| 4 | 1 | 0 |
| 5 | 1 | 1 |
| 6 | 1 | 2 |
| 7 | 1 | 3 |

In another implementation, the terminal device may directly store a correspondence among the index of the pilot signal, the index of the at least one data processing mode, and the value corresponding to the at least one of: the cell identifier of the terminal device, the identifier of the terminal device, the time domain resource information, and the frequency domain resource information. For example, the correspondence may be stored by using a table, and the terminal device may determine the index of the pilot signal by searching the table.

In another implementation, the terminal device may directly store a correspondence between an initial index of the pilot signal and the at least one data processing mode, and the terminal device may determine the initial index of the pilot signal based on the correspondence between the initial index of the pilot signal and the at least one data processing mode, and determine an index f of the pilot signal according to the following formula 19:

$$f=(f_0+S) \bmod K \qquad \text{Formula 22}$$

where $f_0$ is the initial index of the pilot signal, K indicates a quantity of pilot signals that are selectable, and S is a value corresponding to the at least one of: the cell identifier of the terminal device, the identifier of the terminal device, the time domain resource information, and the frequency domain resource information.

Optionally, the initial index $f_0$ may refer to the value y mentioned above, and a specific implementation is not described herein again.

Optionally, in this embodiment of this application, S mentioned in the foregoing embodiments is a value corresponding to the at least one of: the cell identifier of the terminal device, the identifier of the terminal device, the time domain resource information, and the frequency domain resource information. Specifically, the value may be obtained by performing a variation on the at least one of the identifier of the terminal device, the time domain resource information, and frequency domain resource information.

In step 240, the terminal device sends the pilot signal and processed data.

In 250, a network device receives the pilot signal and the data that are sent by the terminal device.

In 260, the network device determines the data processing mode based on the pilot signal.

Optionally, the network device may determine the data processing mode based on a mapping relationship between the pilot signal and the data processing mode.

Optionally, in this embodiment of this application, the terminal device may determine a unique data processing mode or a unique combination of data processing modes based on a received specific pilot signal and the mapping relationship between the data processing mode and the pilot signal.

Optionally, in this embodiment of this application, the mapping relationship between the data processing mode and the pilot signal may be implemented by using a table.

For example, the table may directly present the mapping relationship between the data processing mode and the pilot signal; that is, the data processing mode may be directly found by searching the table.

For example, the table may present the mapping relationship between the index of the data processing mode and the index of the pilot signal; that is, the index of the pilot signal may be used to find the index of the data processing mode by searching the table, so that the data processing mode may be obtained by using the index of the data processing mode.

Optionally, in this embodiment of this application, the mapping relationship between the data processing mode and the pilot signal may be implemented by using a formula.

For example, the index of the pilot signal may be used to obtain the index of the data processing mode by using the formula, so that the data processing mode may be determined by using the index of the data processing mode.

Optionally, the network device may determine the data processing mode based on the mapping relationship between the index of the pilot signal and the index of the data processing mode.

Optionally, the index of the data processing mode is corresponding to all or some bits of the index of the pilot signal; and the network device may determine, based on the index of the pilot signal, a value of a bit that is corresponding to the data processing mode and that is in the index of the pilot signal, and determine the index of the data processing mode.

Optionally, the data processing mode includes a plurality of processing modes, and different processing modes in the plurality of processing modes are corresponding to one or more different bits of the index of the pilot signal; and the network device may determine, based on the index of the pilot signal, values of bits that are corresponding to processing modes in the plurality of processing modes and that are in the index of the pilot signal, and determine an index of each data processing mode.

Optionally, when the specific data processing mode is corresponding to a specific bit of the index of the pilot signal, the network device may determine the index of the data processing mode based on the manners shown in formula 1 to formula 6, and details are not described herein again.

Optionally, the data processing mode includes first to $g^{th}$ processing modes, and g is an integer greater than or equal to 2. The network device may determine the value y based on the index of the pilot signal, and determine the index of the data processing mode based on the value y, where the value y and the index of the data processing mode have the following relationship:

$$y = \sum_{i=1}^{i=g-1} x_i \prod_{j=i+1}^{j=g} N_j + x_g$$

where $x_g$ indicates an index of the $g^{th}$ processing mode, $x_i$ indicates an index of an $i^{th}$ processing mode, and $N_j$ indicates a quantity of $j^{th}$ processing modes that are selectable.

Optionally, the network device may directly determine the index of the data processing mode according to a formula $$y = \sum_{i=1}^{i=g-1} x_i \prod_{j=i+1}^{j=g} N_j + x_g,$$

or may search for a table that meets conditions of the formula.

Optionally, when the quantity K of pilot signals that are selectable is equal to a product of quantities of the first to the $g^{th}$ processing modes that are selectable, the network device may determine the value y based on a condition that meets the following formula:

$$y = (f - S) \bmod K \qquad \text{Formula 23}$$

where S is a value corresponding to the at least one of: the cell identifier of the terminal device, the identifier of the terminal device, the time domain resource information, and the frequency domain resource information.

Optionally, when the quantity K of pilot signals that are selectable is greater than the product of the quantities of the first to the $g^{th}$ processing modes that are selectable, the value y is determined based on a condition that meets the following formula:

$$y = (\lfloor f/q \rfloor - S) \bmod K \qquad \text{Formula 24}$$

where S is the value corresponding to the at least one of: the cell identifier of the terminal device, the identifier of the terminal device, the time domain resource information, and the frequency domain resource information, q is a constant, p belongs to [0, q−1], mod indicates modulo processing, and $\lfloor \cdot \rfloor$ indicates rounding down.

Optionally, q is determined based on a ratio of the quantity of pilot signals that are selectable to the product of the quantities of the first to the $g^{th}$ processing modes that are selectable.

The data processing mode includes the modulation and coding mode and the spreading mode or the interleaving mode, where the pilot signal includes the first parameter and the second parameter, and the index of the pilot signal includes the first index corresponding to the first parameter and the second index corresponding to the second parameter; and that the index of the data processing mode is determined based on the index of the pilot signal includes:

determining the index of the modulation and coding mode and the index of the spreading mode or interleaving mode according to the following formulas 25 and 26:

$$c = (f_1 - S) \bmod K \qquad \text{Formula 25}$$

$$m = f_2 \qquad \text{Formula 26}$$

where m is an index of the modulation and coding mode, c is an index of the interleaving mode or spreading mode, S is a value corresponding to at least one of: the cell identifier of the terminal device, the identifier of the terminal device, the time domain resource information, and the frequency domain resource information, $f_1$ is a first parameter, and $f_2$ is a second parameter.

Optionally, the pilot signal may be a ZC sequence. Then, the first parameter may be a base sequence, and the second parameter may be a cyclic shift parameter; or the first parameter may be a cyclic shift parameter, and the second parameter may be a base sequence.

It should be understood that, in addition to the manners described above, in this embodiment of this application, the index of the data processing mode may further be determined in another manner.

In an implementation, the network device may directly store the correspondence between the index of the pilot signal and the index of the at least one data processing mode. For example, the correspondence may be stored by using a table, and the network device may determine the index of the data processing mode by searching the table. The correspondence between the index of the pilot signal and the index of the at least one data processing mode may be shown in the foregoing Table 4.

In another implementation, the network device may directly store the correspondence among the index of the pilot signal, the index of the at least one data processing mode, and the value corresponding to the at least one of: the cell identifier of the terminal device, the identifier of the terminal device, the time domain resource information, and the frequency domain resource information. For example, the correspondence may be stored by using a table, and the network device may determine the index of the data processing mode by searching the table.

In another implementation, the network device may determine the initial index of the pilot signal according to the following formula 27:

$$f_0 = (f-S) \bmod K \qquad \text{Formula 27}$$

In addition, the network device may directly store the correspondence between the initial index of the pilot signal and the at least one data processing mode, and the terminal device may determine the index of the data processing mode based on the correspondence between the initial index of the pilot signal and the at least one data processing mode.

Optionally, in this embodiment of this application, S mentioned in the foregoing embodiments is the value corresponding to the at least one of: the cell identifier of the terminal device, the identifier of the terminal device, the time domain resource information, and the frequency domain resource information. Specifically, the value may be obtained by performing a variation on the at least one of the identifier of the terminal device, the time domain resource information, and frequency domain resource information. In 270, the network device processes data based on the data processing mode.

Optionally, when the data processing mode includes the modulation and coding mode, the data may be demodulated and decoded.

Optionally, when the data processing mode includes the interleaving mode, data may be de-interleaved based on the interleaving mode.

Optionally, when the data processing mode includes the spreading mode, data may be despread based on the spreading mode.

Therefore, in this embodiment of this application, the terminal device may determine the data processing mode, and the data processing mode includes the modulation and coding mode; data is processed based on the data processing mode; the pilot signal is determined based on the data processing mode; and the pilot signal and the processed data are sent, so that the receive end may determine the data processing mode based on the pilot signal. This avoids complexity of blind detection performed by the receive end on the data processing mode; and further, the terminal device may select a required modulation and coding mode based on a requirement, so as to meet a transmission requirement and improve transmission reliability.

Figure 7:
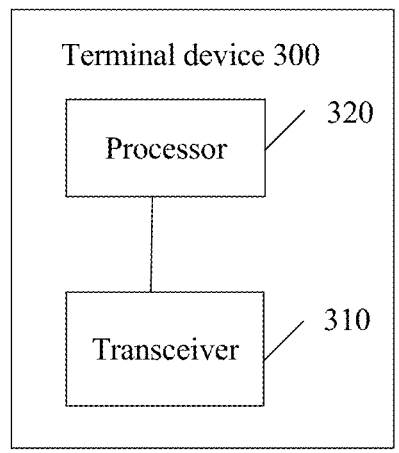
FIG. 7 is a schematic block diagram of a terminal device according to an embodiment of this application.

FIG. 7 is a schematic block diagram of a terminal device according to an embodiment of this application. As shown in FIG. 7, the terminal device 300 includes a transceiver 310 and a processor 320.

It should be understood that, the terminal device 300 may be corresponding to a transmit end of the data and the pilot signal in the method embodiment; that is, the terminal device may have any function of the terminal device in the method. For brevity, some functions of the terminal device shown in FIG. 2 are merely used as an example to describe the terminal device 300. However, this embodiment of this application is not limited thereto.

The processor 320 is configured to: determine a data processing mode, where the data processing mode includes a modulation and coding mode; process data based on the data processing mode; and determine a pilot signal based on the data processing mode.

The transceiver 310 is configured to send the pilot signal and processed data.

Optionally, the data processing mode further include at least one of the following processing modes: an interleaving mode and a spreading mode.

Optionally, the processor 320 is further configured to determine the pilot signal based on a mapping relationship between the data processing mode and the pilot signal.

Optionally, the processor 320 is further configured to: determine the pilot signal based on the data processing mode and at least one of: a cell identifier of the terminal device, an identifier of the terminal device, time domain resource information, and frequency domain resource information.

Optionally, the processor 320 is further configured to determine an index of the pilot signal based on the index of the data processing mode; and determine the pilot signal based on the index of the pilot signal.

Optionally, the index of the data processing mode is corresponding to all or some bits of the index of the pilot signal; and the processor 320 is further configured to: determine, based on the index of the data processing mode, a value of the bit that is corresponding to the data processing mode and that is in the index of the pilot signal, and determine the index of the pilot signal.

Optionally, the data processing mode includes a plurality of processing modes, and different processing modes in the plurality of processing modes are corresponding to one or more different bits of the index of the pilot signal; and the processor 320 is further configured to:

determine, based on an index of each of the plurality of processing modes, a value of a bit that is corresponding to each processing mode and that is in the index of the pilot signal, and determine the index of the pilot signal.

Optionally, the data processing mode includes first to $g^{th}$ processing modes, and g is an integer greater than or equal to 2; and the processor 320 is further configured to:

determine the index of the pilot signal based on a value y, where the value y is determined based on a condition that meets the following formula:

$$y = \sum_{i=1}^{i=g-1} x_i \prod_{j=i+1}^{j=g} N_j + x_g$$

where $x_g$ indicates an index of the $g^{th}$ processing mode, $x_i$ indicates an index of an $i^{th}$ processing mode, and $N_j$ indicates a quantity of $j^{th}$ processing modes that are selectable.

Optionally, when a quantity K of pilot signals that are selectable is equal to a product of the quantities of the first to the $g^{th}$ processing modes that are selectable, the processor 320 is further configured to determine the index of the pilot signal based on a condition that meets the following formula:

$$f = (y+S) \bmod K$$

where S is a value corresponding to the at least one of: the cell identifier of the terminal device, the identifier of the terminal device, the time domain resource information, and the frequency domain resource information, and mod indicates modulo processing.

Optionally, when the quantity K of pilot signals that are selectable is greater than the product of the quantities of the first to the $g^{th}$ processing modes that are selectable, the processor 320 is further configured to:

determine an index f of the pilot signal based on a condition that meets the following formula:

$$f = (q \cdot y + p + S) \bmod K$$

where S is the value corresponding to the at least one of: the cell identifier of the terminal device, the identifier of the terminal device, the time domain resource information, and the frequency domain resource information, q is a constant, p belongs to [0, q−1], and mod indicates the modulo processing.

Optionally, q is determined based on a ratio of the quantity of pilot signals that are selectable to the product of the quantities of the first to the $g^{th}$ processing modes that are selectable.

Optionally, the processor 320 is further configured to: determine the data processing mode based on at least one of the following information:

state information of a channel between the terminal device and a receive end of the data;

a data processing mode corresponding to data that is previously sent to the receive end and information fed back by the receive end for the previously sent data; and a broadcast message or a unicast message of the receive end of the data.

Figure 8:
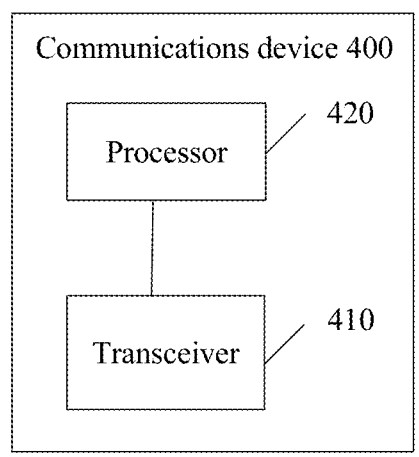
FIG. 8 is a schematic block diagram of a communications device according to an embodiment of this application.

FIG. 8 is a schematic block diagram of a communications device 400 according to an embodiment of this application.

It should be understood that, the communications device 400 may be corresponding to the receive end of the data and the pilot signal in the method embodiment, for example, a network device, and may have any function of the network device in the method. For brevity, some functions of the network device shown in FIG. 2 are merely used as an example to describe the communications device 400. However, this embodiment of this application is not limited thereto.

As shown in FIG. 8, the communications device 400 includes a transceiver 410 and a processor 420.

Optionally, the transceiver 410 is configured to receive a pilot signal and data that are sent by a terminal device; and the processor 420 is configured to: determine a data processing mode based on the pilot signal, where the data processing mode includes a modulation and coding mode; and process the data based on the data processing mode.

Optionally, the data processing mode further include at least one of the following processing modes: an interleaving mode and a spreading mode.

Optionally, the processor 420 is specifically configured to: determine the data processing mode based on a mapping relationship between the pilot signal and the data processing mode.

Optionally, the processor 420 is specifically configured to: determine the data processing mode based on the pilot signal and at least one of: a cell identifier of the terminal device, an identifier of the terminal device, time domain resource information, and frequency domain resource information.

Optionally, the processor 420 is specifically configured to: determine an index of the data processing mode based on an index of the pilot signal; and determine the data processing mode based on the index of the data processing mode.

Optionally, the index of the data processing mode is corresponding to all or some bits of the index of the pilot signal; and the processor 420 is specifically configured to:

determine, based on the index of the pilot signal, a value of a bit that is corresponding to the data processing mode and that is in the index of the pilot signal, and determine the index of the data processing mode.

Optionally, the data processing mode includes a plurality of processing modes, and different processing modes in the plurality of processing modes are corresponding to one or more different bits of the index of the pilot signal; and the processor 420 is specifically configured to:

determine, based on the index of the pilot signal, a value of a bit that is corresponding to each of the plurality of processing modes and that is in the index of the pilot signal, and determine an index of each data processing mode.

Optionally, the data processing mode includes first to $g^{th}$ processing modes, and g is an integer greater than or equal to 2; and the processor 420 is specifically configured to:

determine a value y based on the index of the pilot signal; and determine the index of the data processing mode based on the value y, where the value y and the index of the data processing mode have the following relationship:

$$y = \sum_{i=1}^{i=g-1} x_i \prod_{j=i+1}^{j=g} N_j + x_g$$

where $x_g$ indicates an index of the $g^{th}$ processing mode, $x_i$ indicates an index of an $i^{th}$ processing mode, and $N_j$ indicates a quantity of $j^{th}$ processing modes that are selectable.

Optionally, the processor 420 is specifically configured to: when a quantity K of pilot signals that are selectable is equal to a product of quantities of the first to the $g^{th}$ processing modes that are selectable, determine the value y based on a condition that meets the following formula:

$y=(f-S) \bmod K$ where S is a value corresponding to the at least one of: the cell identifier of the terminal device, the identifier of the terminal device, the time domain resource information, and the frequency domain resource information.

Optionally, the processor 420 is specifically configured to: when the quantity K of pilot signals that are selectable is greater than the product of the quantities of the first to the $g^{th}$ processing modes that are selectable, determine the value y based on a condition that meets the following formula:

$y=(\lfloor f/q \rfloor -S) \bmod K$ where S is the value corresponding to at least one of: the cell identifier of the terminal device, the identifier of the terminal device, the time domain resource information, and the frequency domain resource information, q is a constant, p belongs to [0, q−1], mod indicates modulo processing, and $\lfloor \cdot \rfloor$ indicates rounding down.

Optionally, q is determined based on a ratio of the quantity of pilot signals that are selectable to the product of the quantities of the first to the $g^{th}$ processing modes that are selectable.

It should be understood, that the processor 320 and/or the processor 420 in the embodiments of this application may be implemented by using a processing unit or a chip.

It should be understood that, the transceiver 310 or the transceiver 410 in the embodiments of this application may be implemented by using a transceiver unit or a chip. Optionally, the transceiver 310 or the transceiver 410 may include a transmitter and a receiver, or may include a transmit unit and a receiving unit.

Optionally, the terminal device 300 and the communications device 400 may further include a memory. The memory may store program code, and the processor invokes the program code stored in the memory to implement corresponding functions of the network device or the terminal device.

An embodiment of this application further provides a system, where the system may include the terminal device 300 and the communications device 400.

Therefore, in the embodiments of this application, the terminal device may determine the data processing mode, and the data processing mode includes the modulation and coding mode; data is processed based on the data processing mode; the pilot signal is determined based on the data processing mode; and the pilot signal and the processed data are sent, so that the receive end may determine the data processing mode based on the pilot signal. This avoids complexity of blind detection performed by the receive end on the data processing mode; and further, the terminal device may select a required modulation and coding mode based on a requirement, so as to meet a transmission requirement and improve transmission reliability.

In the implementations of this application, the apparatus may be a field-programmable gate array (FPGA), may be an application-specific integrated circuit (ASIC), may be a system on chip (SoC), may be a central processing unit (CPU), may be a network processor (NP), may be a digital signal processing circuit (DSP), may be a micro controller unit (MCU), or may be a programmable controller (PLD) or another integrated chip.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

Further embodiments of the present disclosure are provided in the following. It should be noted that the numbering used in the following section does not necessarily need to comply with the numbering used in the previous sections.

Embodiment 1

An information transmission method, comprising:
determining, by a terminal device, a data processing mode, wherein the data processing mode comprises a modulation and coding mode;
processing data based on the data processing mode;
determining a pilot signal based on the data processing mode; and
sending the pilot signal and processed data.

Embodiment 2

The method according to embodiment 1, wherein the data processing mode further comprises at least one of the following processing modes: an interleaving mode and a spreading mode.

Embodiment 3

The method according to embodiment 1 or 2, wherein the determining a pilot signal based on the data processing mode is specifically:
determining the pilot signal based on a mapping relationship between the data processing mode and the pilot signal.

Embodiment 4

The method according to any one of embodiments 1 to 3, wherein the determining a pilot signal based on the data processing mode is specifically:
determining the pilot signal based on the data processing mode and at least one of: a cell identifier of the terminal device, an identifier of the terminal device, time domain resource information, and frequency domain resource information.

Embodiment 5

The method according to any one of embodiments 1 to 4, wherein the determining a pilot signal based on the data processing mode is specifically:
determining an index of the pilot signal based on an index of the data processing mode; and
determining the pilot signal based on the index of the pilot signal.

Embodiment 6

The method according to embodiment 5, wherein the index of the data processing mode is corresponding to all or some bits of the index of the pilot signal; and
the determining an index of the pilot signal based on an index of the data processing mode is specifically:
determining, based on the index of the data processing mode, a value of the bit that is corresponding to the data processing mode and that is in the index of the pilot signal, and determining the index of the pilot signal.

Embodiment 7

The method according to embodiment 6, wherein the data processing mode comprises a plurality of processing modes, and different processing modes in the plurality of processing modes are corresponding to one or more different bits of the index of the pilot signal; and
the determining an index of the pilot signal based on an index of the data processing mode is specifically:
determining, based on an index of each of the plurality of processing modes, a value of a bit that is corresponding to each processing mode and that is in the index of the pilot signal, and determining the index of the pilot signal.

Embodiment 8

The method according to embodiment 6, wherein the data processing mode comprises first to $g^{th}$ processing modes, and g is an integer greater than or equal to 2; and the determining an index of the pilot signal based on an index of the data processing mode is specifically:
determining the index of the pilot signal based on a value y, wherein the value y is determined based on a condition that meets the following formula:

$$y = \sum_{i=1}^{i=g-1} x_i \prod_{j=i+1}^{j=g} N_j + x_g$$

wherein $x_g$ indicates an index of the $g^{th}$ processing mode, $x_i$ indicates an index of an $i^{th}$ processing mode, and $N_j$ indicates a quantity of $j^{th}$ processing modes that are selectable.

Embodiment 9

The method according to embodiment 8, wherein
when a quantity K of pilot signals that are selectable is equal to a product of quantities of the first to the $g^{th}$ processing modes that are selectable, the determining the index of the pilot signal based on a value y is specifically:
determining an index f of the pilot signal based on a condition that meets the following formula:

$$f=(y+S) \bmod K$$

wherein S is a value corresponding to the at least one of: the cell identifier of the terminal device, the identifier of the terminal device, the time domain resource information, and the frequency domain resource information, and mod indicates modulo processing.

Embodiment 10

The method according to embodiment 9, wherein
when the quantity K of pilot signals that are selectable is greater than the product of the quantities of the first to the $g^{th}$ processing modes that are selectable, the determining the index of the pilot signal based on a value y is specifically:
determining the index f of the pilot signal based on a condition that meets the following formula:

$$f=(q \cdot y+p+S) \bmod K$$

wherein S is the value corresponding to the at least one of: the cell identifier of the terminal device, the identifier of the terminal device, the time domain resource information, and the frequency domain resource information, q is a constant, p belongs to [0, q−1], and mod indicates the modulo processing.

Embodiment 11

The method according to embodiment 10, wherein q is determined based on a ratio of the quantity of pilot signals that are selectable to the product of the quantities of the first to the $g^{th}$ processing modes that are selectable.

Embodiment 12

The method according to any one of embodiments 1 to 11, wherein the determining, by a terminal device, a data processing mode is specifically:
determining, by the terminal device, the data processing mode based on at least one of the following information:
state information of a channel between the terminal device and a receive end of the data;
a data processing mode corresponding to data that is previously sent to the receive end and information fed back by the receive end for the previously sent data; and
a broadcast message or a unicast message of the receive end of the data.

Embodiment 13

An information transmission method, comprising:
receiving a pilot signal and data that are sent by a terminal device;
determining a data processing mode based on the pilot signal, wherein the data processing mode comprises a modulation and coding mode; and
processing data based on the data processing mode.

Embodiment 14

The method according to embodiment 13, wherein the data processing mode further comprise at least one of the following processing modes: an interleaving mode and a spreading mode.

Embodiment 15

The method according to embodiment 13 or 14, wherein the determining a data processing mode based on the pilot signal is specifically:
determining the data processing mode based on a mapping relationship between the pilot signal and the data processing mode.

Embodiment 16

The method according to any one of embodiments 13 to 15, wherein the determining the data processing mode based on the pilot signal is specifically:
determining the data processing mode based on the pilot signal and at least one of: a cell identifier of the terminal device, an identifier of the terminal device, time domain resource information, and frequency domain resource information.

Embodiment 17

The method according to any one of embodiments 13 to 16, wherein the determining a data processing mode based on the pilot signal is specifically:
determining an index of the data processing mode based on an index of the pilot signal; and
determining the data processing mode based on the index of the data processing mode.

Embodiment 18

The method according to embodiment 17, wherein the index of the data processing mode is corresponding to all or some bits of the index of the pilot signal; and
the determining an index of the data processing mode based on an index of the pilot signal is specifically:
determining, based on the index of the pilot signal, a value of the bit that is corresponding to the data processing mode and that is in the index of the pilot signal, and determining the index of the data processing mode.

Embodiment 19

The method according to embodiment 18, wherein the data processing mode comprises a plurality of processing modes, and different processing modes in the plurality of processing modes are corresponding to one or more different bits of the index of the pilot signal; and
the determining an index of the data processing mode based on an index of the pilot signal is specifically:
determining, based on the index of the pilot signal, a value of a bit that is corresponding to each of the plurality of processing modes and that is in the index of the pilot signal, and determining an index of each data processing mode.

Embodiment 20

The method according to embodiment 17, wherein the data processing mode comprises first to $g^{th}$ processing modes, and g is an integer greater than or equal to 2; and the determining an index of the data processing mode based on an index of the pilot signal is specifically:

determining a value y based on the index of the pilot signal; and determining the index of the data processing mode based on the value y, wherein the value y and the index of the data processing mode have the following relationship:

$$y = \sum_{i=1}^{i=g-1} x_i \prod_{j=i+1}^{j=g} N_j + x_g$$

wherein $x_g$ indicates an index of the $g^{th}$ processing mode, $x_i$ indicates an index of an $i^{th}$ processing mode, and $N_j$ indicates a quantity of $j^{th}$ processing modes that are selectable.

Embodiment 21

The method according to embodiment 20, wherein the determining a value y based on the index of the pilot signal is specifically:

when a quantity K of pilot signals that are selectable is equal to a product of quantities of the first to the $g^{th}$ processing modes that are selectable, determining the value y based on a condition that meets the following formula:

$y=(f-S) \bmod K$ wherein S is a value corresponding to the at least one of: the cell identifier of the terminal device, the identifier of the terminal device, the time domain resource information, and the frequency domain resource information.

Embodiment 22

The method according to embodiment 21, wherein the determining a value y based on the index of the pilot signal is specifically:

when the quantity K of pilot signals that are selectable is greater than the product of the quantities of the first to the $g^{th}$ processing modes that are selectable, determining the value y based on a condition that meets the following formula:

$y=(\lfloor f/q \rfloor - S) \bmod K$ wherein S is the value corresponding to the at least one of: the cell identifier of the terminal device, the identifier of the terminal device, the time domain resource information, and the frequency domain resource information, q is a constant, p belongs to [0, q−1], mod indicates modulo processing, and $\lfloor \cdot \rfloor$ indicates rounding down.

Embodiment 23

The method according to embodiment 22, wherein q is determined based on a ratio of the quantity of pilot signals that are selectable to the product of the quantities of the first to the $g^{th}$ processing modes that are selectable.

Embodiment 24

A terminal device, comprising a transceiver and a processor, wherein the processor is configured to: determine a data processing mode, wherein the data processing mode comprises a modulation and coding mode; process data based on the data processing mode; and determine a pilot signal based on the data processing mode; and the transceiver is configured to send the pilot signal and processed data.

Embodiment 25

The terminal device according to embodiment 24, wherein the data processing mode further comprise at least one of the following processing modes: an interleaving mode and a spreading mode.

Embodiment 26

The terminal device according to embodiment 24 or 25, wherein the processor is specifically configured to:

determine the pilot signal based on a mapping relationship between the data processing mode and the pilot signal.

Embodiment 27

The terminal device according to any one of embodiments 24 to 26, wherein the processor is specifically configured to:

determine the pilot signal based on the data processing mode and at least one of: a cell identifier of the terminal device, an identifier of the terminal device, time domain resource information, and frequency domain resource information.

Embodiment 28

The terminal device according to any one of embodiments 24 to 27, wherein the processor is specifically configured to:

determine an index of the pilot signal based on an index of the data processing mode; and determine the pilot signal based on the index of the pilot signal.

Embodiment 29

The terminal device according to embodiment 28, wherein the index of the data processing mode is corresponding to all or some bits of the index of the pilot signal; and the processor is specifically configured to:

determine, based on the index of the data processing mode, a value of the bit that is corresponding to the data processing mode and that is in the index of the pilot signal, and determine the index of the pilot signal.

Embodiment 30

The terminal device according to embodiment 29, wherein the data processing mode comprises a plurality of processing modes, and different processing modes in the plurality of processing modes are corresponding to one or more different bits of the index of the pilot signal; and the processor is specifically configured to:

determine, based on an index of each of the plurality of processing modes, a value of a bit that is corresponding to each processing mode and that is in the index of the pilot signal, and determine the index of the pilot signal.

Embodiment 31

The terminal device according to embodiment 29, wherein the data processing mode comprises first to $g^{th}$ processing modes, and g is an integer greater than or equal to 2; and the processor is specifically configured to:
determine the index of the pilot signal based on a value y, wherein the value y is determined based on a condition that meets the following formula:

$$y = \sum_{i=1}^{i=g-1} x_i \prod_{j=i+1}^{j=g} N_j + x_g$$

wherein $x_g$ indicates an index of the $g^{th}$ processing mode, $x_i$ indicates an index of an $i^{th}$ processing mode, and $N_j$ indicates a quantity of $j^{th}$ processing modes that are selectable.

Embodiment 32

The terminal device according to embodiment 31, wherein
when a quantity K of pilot signals that are selectable is equal to a product of quantities of the first to the $g^{th}$ processing modes that are selectable, the processor is specifically configured to:
determine an index f of the pilot signal based on a condition that meets the following formula, wherein:

$f=(y+S) \bmod K,$

S is a value corresponding to the at least one of: the cell identifier of the terminal device, the identifier of the terminal device, the time domain resource information, and the frequency domain resource information, and mod indicates modulo processing.

Embodiment 33

The terminal device according to embodiment 32, wherein
when the quantity K of pilot signals that are selectable is greater than the product of the quantities of the first to the $g^{th}$ processing modes that are selectable, the processor is specifically configured to:
determine the index f of the pilot signal based on a condition that meets the following formula, wherein:

$f=(q \cdot y+p+S) \bmod K,$ wherein S is the value corresponding to the at least one of: the cell identifier of the terminal device, the identifier of the terminal device, the time domain resource information, and the frequency domain resource information, q is a constant, p belongs to [0, q−1], and mod indicates the modulo processing.

Embodiment 34

The terminal device according to embodiment 33, wherein q is determined based on a ratio of the quantity of pilot signals that are selectable to the product of the quantities of the first to the $g^{th}$ processing modes that are selectable.

Embodiment 35

The terminal device according to any one of embodiments 24 to 34, wherein the processor is specifically configured to:
determine the data processing mode based on at least one of the following information:
state information of a channel between the terminal device and a receive end of the data;
a data processing mode corresponding to data that is previously sent to the receive end and information fed back by the receive end for the previously sent data; and
a broadcast message or a unicast message of the receive end of the data.

Embodiment 36

A communications device, comprising a transceiver and a processor, wherein
the transceiver is configured to receive a pilot signal and data that are sent by a terminal device; and
the processor is configured to: determine a data processing mode based on the pilot signal, wherein the data processing mode comprises a modulation and coding mode; and process the data based on the data processing mode.

Embodiment 37

The communications device according to embodiment 36, wherein the data processing mode further comprise at least one of the following processing modes: an interleaving mode and a spreading mode.

Embodiment 38

The communications device according to embodiment 36 or 37, wherein the processor is specifically configured to:
determine the data processing mode based on a mapping relationship between the pilot signal and the data processing mode.

Embodiment 39

The communications device according to any one of embodiments 36 to 38, wherein the processor is specifically configured to:
determine the data processing mode based on the pilot signal and at least one of: a cell identifier of the terminal device, an identifier of the terminal device, time domain resource information, and frequency domain resource information.

Embodiment 40

The communications device according to any one of embodiments 36 to 39, wherein the processor is specifically configured to:
determine an index of the data processing mode based on an index of the pilot signal; and
determine the data processing mode based on the index of the data processing mode.

Embodiment 41

The communications device according to embodiment 40, wherein the index of the data processing mode is corresponding to all or some bits of the index of the pilot signal; and the processor is specifically configured to:

determine, based on the index of the pilot signal, a value of the bit that is corresponding to the data processing mode and that is in the index of the pilot signal, and determine the index of the data processing mode.

Embodiment 42

The communications device according to embodiment 41, wherein the data processing mode comprises a plurality of processing modes, and different processing modes in the plurality of processing modes are corresponding to one or more different bits of the index of the pilot signal; and the processor is specifically configured to:

determine, based on the index of the pilot signal, a value of a bit that is corresponding to each of the plurality of processing modes and that is in the index of the pilot signal, and determine an index of each data processing mode.

Embodiment 43

The communications device according to embodiment 40, wherein the data processing mode comprises first to $g^{th}$ processing modes, and g is an integer greater than or equal to 2; and the processor is specifically configured to:

determine a value y based on the index of the pilot signal; and determine the index of the data processing mode based on the value y, wherein the value y and the index of the data processing mode have the following relationship:

$$y = \sum_{i=1}^{i=g-1} x_i \prod_{j=i+1}^{j=g} N_j + x_g$$

wherein $x_g$ indicates an index of the $g^{th}$ processing mode, $x_i$ indicates an index of an $i^{th}$ processing mode, and $N_j$ indicates a quantity of $i^{th}$ processing modes that are selectable.

Embodiment 44

The communications device according to embodiment 43, wherein the processor is specifically configured to:

when a quantity K of pilot signals that are selectable is equal to a product of quantities of the first to the $g^{th}$ processing modes that are selectable, determine the value y based on a condition that meets the following formula:

$y=(f-S)\mod K$ wherein S is a value corresponding to the at least one of: the cell identifier of the terminal device, the identifier of the terminal device, the time domain resource information, and the frequency domain resource information.

Embodiment 45

The communications device according to embodiment 44, wherein the processor is specifically configured to:

when the quantity K of pilot signals that are selectable is greater than the product of the quantities of the first to the $g^{th}$ processing modes that are selectable, determine the value y based on a condition that meets the following formula:

$y=(\lfloor f/q \rfloor-S)\mod K$ wherein S is the value corresponding to the at least one of: the cell identifier of the terminal device, the identifier of the terminal device, the time domain resource information, and the frequency domain resource information, q is a constant, p belongs to [0, q−1], mod indicates modulo processing, and $\lfloor \cdot \rfloor$ indicates rounding down.

Embodiment 46

The communications device according to embodiment 45, wherein q is determined based on a ratio of the quantity of pilot signals that are selectable to the product of the quantities of the first to the $g^{th}$ processing modes that are selectable.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of the present disclosure shall be subject to the protection scope of the claims.

What is claimed is:

1. An information transmission method, comprising:
receiving a pilot signal and data sent by a terminal device;
determining a data processing mode based on a mapping relationship between the pilot signal and the data processing mode, wherein the data processing mode comprises a modulation and coding mode, and the mapping relationship indicates the pilot signal corresponds to the data processing mode; and
processing data based on the data processing mode.

2. The method according to claim 1, wherein the data processing mode further comprise at least one of the following processing modes: an interleaving mode and a spreading mode.

3. The method according to claim 1, wherein determining the data processing mode based on the pilot signal comprises:
determining the data processing mode based on the pilot signal and at least one of: a cell identifier of the terminal device, an identifier of the terminal device, time domain resource information, and frequency domain resource information.

4. The method according to claim 1, wherein determining the data processing mode based on the pilot signal comprises:
determining an index of the data processing mode based on an index of the pilot signal; and
determining the data processing mode based on the index of the data processing mode.

5. The method according to claim 4, wherein:
the index of the data processing mode corresponds to all or some bits of the index of the pilot signal; and
determining the index of the data processing mode based on an index of the pilot signal comprises:
determining, based on the index of the pilot signal, a value of the bit that corresponds to the data processing mode and that is in the index of the pilot signal, and determining the index of the data processing mode.

6. A terminal device, comprising:
a processor configured to:
determine a data processing mode, wherein the data processing mode comprises a modulation and coding mode,
process data based on the data processing mode, and
determine a pilot signal based on a mapping relationship between the pilot signal and the data processing mode, wherein the mapping relationship indicates the pilot signal corresponds to the data processing mode; and
a transceiver configured to send the pilot signal and processed data.

7. The terminal device according to claim 6, wherein the data processing mode further comprise at least one of the following processing modes: an interleaving mode and a spreading mode.

8. The terminal device according to claim 6, wherein the processor is configured to:
determine the pilot signal based on the data processing mode and at least one of: a cell identifier of the terminal device, an identifier of the terminal device, time domain resource information, and frequency domain resource information.

9. The terminal device according to claim 6, wherein the processor is configured to:
determine an index of the pilot signal based on an index of the data processing mode; and
determine the pilot signal based on the index of the pilot signal.

10. The terminal device according to claim 9, wherein:
the index of the data processing mode corresponds to all or some bits of the index of the pilot signal; and
the processor is configured to:
determine, based on the index of the data processing mode, a value of the bit that corresponds to the data processing mode and that is in the index of the pilot signal, and determine the index of the pilot signal.

11. The terminal device according to claim 10, wherein:
the data processing mode comprises a plurality of processing modes, and different processing modes in the plurality of processing modes correspond to one or more different bits of the index of the pilot signal; and
the processor is configured to:
determine, based on an index of each of the plurality of processing modes, a value of a bit that corresponds to each processing mode and that is in the index of the pilot signal, and determine the index of the pilot signal.

12. A communications device, comprising:
a transceiver configured to receive a pilot signal and data that are sent by a terminal device; and
a processor configured to:
determine a data processing mode based on a mapping relationship between the pilot signal and the data processing mode, wherein the data processing mode comprises a modulation and coding mode, and the mapping relationship indicates the pilot signal corresponds to the data processing mode; and
process the data based on the data processing mode.

13. The communications device according to claim 12, wherein the data processing mode further comprise at least one of the following processing modes: an interleaving mode and a spreading mode.

14. The communications device according to claim 12, wherein the processor is configured to:
determine the data processing mode based on the pilot signal and at least one of: a cell identifier of the terminal device, an identifier of the terminal device, time domain resource information, and frequency domain resource information.

15. The communications device according to claim 12, wherein the processor is configured to:
determine an index of the data processing mode based on an index of the pilot signal; and
determine the data processing mode based on the index of the data processing mode.

16. The communications device according to claim 15, wherein:
the index of the data processing mode corresponds to all or some bits of the index of the pilot signal; and
the processor is configured to:
determine, based on the index of the pilot signal, a value of the bit that corresponds to the data processing mode and that is in the index of the pilot signal, and determine the index of the data processing mode.

17. The communications device according to claim 15, wherein:
the data processing mode comprises a plurality of processing modes, and different processing modes in the plurality of processing modes correspond to one or more different bits of the index of the pilot signal; and
the processor is configured to:
determine, based on the index of the pilot signal, a value of a bit that corresponds to each of the plurality of processing modes and that is in the index of the pilot signal, and determine an index of each data processing mode.

* * * * *